United States Patent
Smith et al.

(10) Patent No.: US 12,391,083 B1
(45) Date of Patent: Aug. 19, 2025

(54) SUSPENSION AIR SPRING WITH CONTINUOUSLY VARIABLE VOLUME

(71) Applicant: GM GLOBAL TECHNOLOGY OPERATIONS LLC, Detroit, MI (US)

(72) Inventors: Kyle M. Smith, Milford, MI (US); Robert Patrick Marble, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/761,658

(22) Filed: Jul. 2, 2024

(51) Int. Cl.
*B60G 11/27* (2006.01)

(52) U.S. Cl.
CPC ........ *B60G 11/27* (2013.01); *B60G 2202/152* (2013.01)

(58) Field of Classification Search
CPC .......................... B60G 11/27; B60G 2202/152
See application file for complete search history.

(56) References Cited

U.S. PATENT DOCUMENTS

| | | | |
|---|---|---|---|
| 2,226,605 A * | 12/1940 | Geyer | B60G 11/27 267/64.23 |
| 4,629,170 A | 12/1986 | Warmuth, II | |
| 5,413,316 A | 5/1995 | Easter | |
| 8,973,932 B2 * | 3/2015 | Pielock | F16F 9/0463 280/124.157 |
| 10,272,731 B2 * | 4/2019 | Pniewski | F16F 9/3214 |
| 2023/0067895 A1 * | 3/2023 | Schweisthal | B60G 15/12 |
| 2024/0166012 A1 | 5/2024 | Khajepour et al. | |

FOREIGN PATENT DOCUMENTS

| | | |
|---|---|---|
| CN | 102330771 A | 1/2012 |
| EP | 1529981 A1 | 5/2005 |
| WO | WO-2020033247 A1 | 2/2020 |

OTHER PUBLICATIONS

German Office Action from counterpart DE1020241244828, dated Apr. 1, 2025.

* cited by examiner

*Primary Examiner* — Faye M Fleming

(57) ABSTRACT

A suspension air spring includes a spring mount assembly and a diaphragm seat spaced from the spring mount. A diaphragm includes a first end that is mounted to the spring mount assembly and a second end that is mounted to the diaphragm to create a main volume between the spring mount assembly and the diaphragm seat. The diaphragm rolls upon the diaphragm seat. An inflatable secondary bladder is disposed within the main volume.

20 Claims, 2 Drawing Sheets

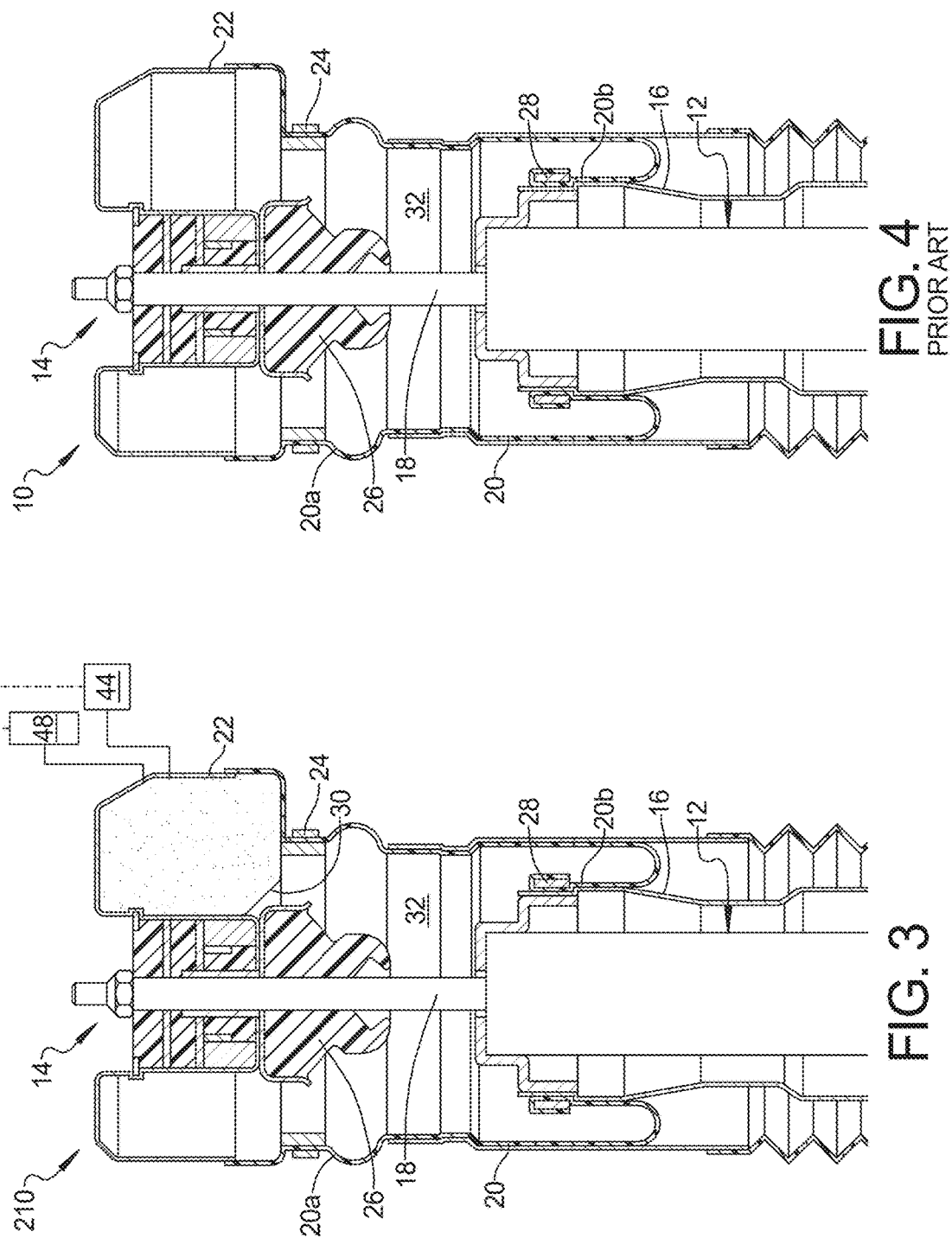

SUSPENSION AIR SPRING WITH CONTINUOUSLY VARIABLE VOLUME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle suspension air springs and more particularly to a suspension air spring with continuously variable volume.

The working volume of most automotive air springs is fixed when it leaves the factory. There are a few vehicles available with air springs that can switch between two or three discreate volumes. The present disclosure allows for continuous variation between the maximum and minimum volumes of the air spring.

SUMMARY

The present disclosure is for an automotive suspension air spring which relies on a contained volume of air at a specified pressure to provide a desired force and spring rate to support the vehicle body and isolate it from road inputs. Specifically, the present disclosure improves upon the current automotive air spring by incorporating a flexible secondary bladder inside the main working volume of the spring.

This secondary bladder may be filled with compressed air or by an incompressible fluid. This will cause the bladder to expand, displacing or reducing a portion of the volume of the main chamber, increasing the spring rate of the overall system. Alternatively, if full, the bladder may be emptied to increase the volume of the main chamber, reducing the overall spring rate. Additionally, the volume of the secondary bladder is not limited to just its maximum and minimum volumes, but could be varied between those two limits allowing for continuous adjustment of the air spring rate.

The filling and emptying of the secondary bladder would be controlled by the air spring electrical control unit (ECU) and its behavior could be changed via calibration.

According to an aspect of the present disclosure, a suspension air spring includes a spring mount assembly and a diaphragm seat spaced from the spring mount. A diaphragm includes a first end that is mounted to the spring mount assembly and a second end that is mounted to the diaphragm to create a main volume between the spring mount assembly and the diaphragm seat. The diaphragm rolls upon the diaphragm seat. An inflatable secondary bladder is disposed within the main volume.

According to a further aspect, a fluid source is in communication with the inflatable secondary bladder.

According to a further aspect, a control unit controls delivery of a fluid from the fluid source to the inflatable secondary bladder.

According to a further aspect, a valve is controlled by the control unit for allowing release of the fluid from the inflatable secondary bladder.

According to a further aspect, a compressed air source is in communication with the inflatable secondary bladder.

According to a further aspect, a control unit controls delivery of compressed air from the compressed air source to the inflatable secondary bladder.

According to a further aspect, a valve is configured to be controlled by the control unit for allowing release of the compressed air from the inflatable secondary bladder.

According to a further aspect, a strut assembly supports the diaphragm seat and includes a piston rod connected to the spring mount assembly and includes a piston within a cylinder of the strut assembly.

According to a further aspect, a jounce bumper is connected to the spring mount assembly opposite the diaphragm seat.

According to a further aspect, the jounce bumper surrounds the piston rod.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is an axial cross section of an air spring of the rolling lobe type with an inflated secondary bladder within the air spring and supplied by a compressed air source; and FIG. 4 is an axial cross section of a conventional air spring of the rolling lobe type.

In the drawings, reference numbers may be reused to identify similar and/or identical elements.

DETAILED DESCRIPTION

Figure 1:
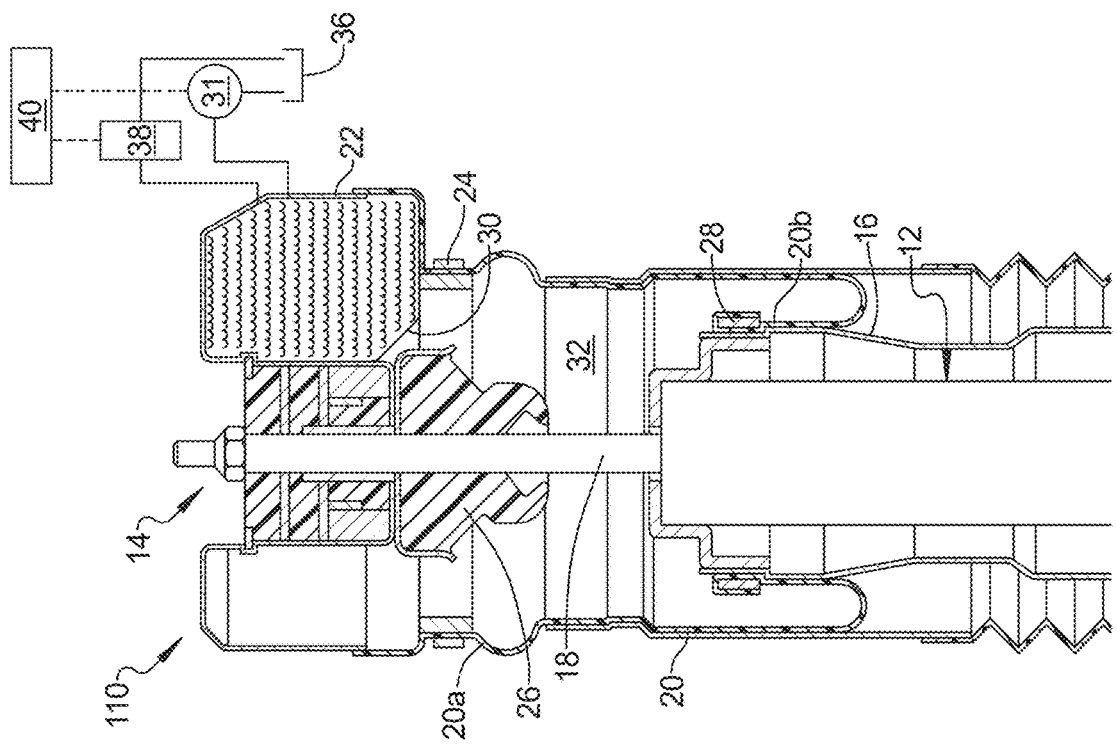
FIG. 1 is an axial cross section of an air spring of the rolling lobe type with an uninflated secondary bladder within the air spring and supplied by a fluid source.

With reference to FIG. 4, a conventional air spring 10 is disclosed which includes a strut assembly 12 downwardly extending from a mounting assembly 14. A sleeve 16 is mounted to an upper end of the strut assembly 12. A piston rod 18 is connected to the mounting assembly 14 and extends into the strut assembly 12. An upper end 20a of a diaphragm 20 is clamped onto a cup-shaped flange 22 of the mounting assembly 14 by a clamp 24. A jounce bumper 26 is mounted to the mounting assembly 14. The jounce bumper 26 engages a top of the strut assembly 12 upon sufficient compression of the strut assembly 12.

A clamp 28 clamps a bottom end 20b of the flexible diaphragm 20 onto a portion of the sleeve 16 which functions as a diaphragm seat assembly. The flexible diaphragm 20 rolls upon the sleeve 16 below the clamp 28. The sleeve 16 provides for varied spring rates at different levels of deflection of the vehicle body with respect to the wheels.

Figure 2:
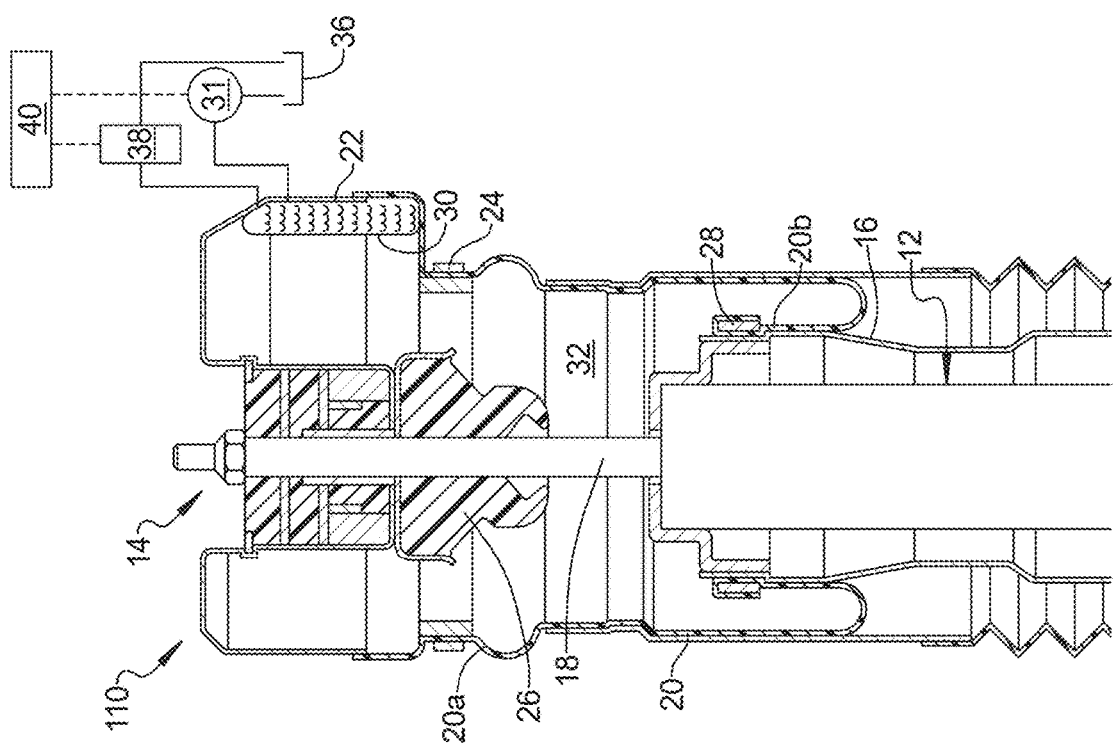
FIG. 2 is an axial cross section of an air spring of the rolling lobe type with an inflated secondary bladder within the air spring and supplied by a fluid source.

With reference to FIGS. 1 and 2, the suspension air spring 110 according to the principles of the present disclosure includes a secondary bladder 30 inside the main air chamber 32. By filling the secondary bladder with air or fluid, the spring rate and spring rate progression of the overall spring assembly can be varied. A volume of the secondary bladder 30 can be continuously varied between its maximum (see FIG. 3) and minimum (see FIG. 2) volumes.

According to a first option, the secondary bladder 30 can be filled with an incompressible fluid (such as damper oil). According to this embodiment, the incompressible fluid can be forced into the secondary bladder by a pump 34 or other existing pressurizing source. The fluid can be stored in a reservoir, sump or accumulator 36. A valve mechanism 38 can be controlled to release the fluid from the secondary bladder 30. A suspension control unit 40 can be used to control the pump or other pressurizing source 34 to supply the fluid to the secondary bladder 30 and the suspension control unit 40 can control the valve mechanism 38 to release fluid from the secondary bladder 30.

The secondary bladder 30 could be empty, full or partially full. An empty secondary bladder, as shown in FIG. 1, results in the largest working volume in the main chamber 32. This produces the lowest spring rate for a given pressure. A full secondary bladder 30 as shown in FIG. 2, results in the smallest working volume in the main chamber 32. This produces the highest spring rate for a given pressure. The secondary bladder 30 could be filled to any volume between max and min (empty). This would allow for the selection of any possible rate between the rates defined by the empty and full states. The benefit of this option over an air spring system that switches between discrete volumes is that it allows for fine tuning of spring rates via software calibration.

According to an alternative option as shown in FIG. 3, the secondary bladder 30 of the air spring 210 can be filled with compressed air at a higher pressure than the main working chamber 32. This would result in a secondary bladder 30 that is fully expanded at normal ride height. According to this embodiment, the compressed air can be forced into the secondary bladder by a compressor 44 or other existing pressurizing source. A valve mechanism 48 can be controlled to release the fluid from the secondary bladder 30. The suspension control unit 40 can be used to control the compressor or other source 44 to supply the compressed air to the secondary bladder 30 and the suspension control unit 40 can control the valve mechanism 48 to release air from the secondary bladder 30.

The effective working volume of the main chamber 32 would be reduced by the volume of the secondary bladder 30, similar to the 'Full' state of the fluid option.

As the suspension is compressed, the dynamic pressure in the main chamber 32 will increase. If the displacement is large enough, the pressure in the main chamber 32 will increase until it is the same as the pressure in the secondary bladder 30. Once that happens, the dynamic working volume of the air spring will be equal to the total volume (primary plus secondary). The result is a drop spring rate (but not force).

By reducing the rate, the force (and therefore pressure) in the air spring 10 will not increase as quickly with suspension displacement. The benefit of this option is that it provides additional margin to the burst pressure of the air spring 10.

A typical use case would be a vehicle that has a high payload capacity. When fully loaded, higher pressures are needed to retrim the vehicle, but raising the body allows for additional suspension travel. This combination leads to high dynamic pressures in the air spring 10. This approach would lower those peak dynamic pressures, making the burst pressure less of a design constraint.

When the volume of the secondary bladder 30 is changed by adding/removing fluid, this will in turn reduce/increase the volume of the main chamber. The system controller 40 will have to coordinate the volume changes of the two volumes to avoid unintended changes in the spring rate or vehicle trim height. This could be accomplished by directly measuring pressure in the main chamber 32 and/or measuring or estimating the fluid flow into the secondary bladder 30. These measurements could be used in a state estimation algorithm.

If compressed air is used in the secondary bladder 30, it will automatically expand to its maximum volume as long as the pressure is higher than the main chamber 32. Measuring the pressure of the two volumes 30, 32 would be sufficient to understand the state of the system.

The volume of the secondary bladder 30 could also be changed dynamically, not just statically.

In order to move air or fluid into the secondary bladder 30, it must overcome the pressure of the main chamber 32. The solution would depend on the medium used in the secondary bladder 30.

In the case of fluid, a positive displacement fluid pump might be needed to move the fluid from a reserve tank 36 to the secondary bladder 30. An alternative would be to use the pressure in the air tank to pressurize an accumulator. As long as this pressure is higher than the main chamber, it could be used to move the fluid in to the bladder.

If compressed air is used in the secondary bladder 30, the solution would depend on the desired pressure of the secondary bladder 30. If it is less than what is provided in the air tank, then no further pumps would be needed. However, if the desired pressure is greater, a secondary pump would be required, or the main pump could be designed to provide the higher pressures needed.

A potential enhancement to a single chamber air spring would be to replace the solid volume stuffer with a deformable one of the same volume but charged to a higher pressure (similar to a tennis ball). The air spring would retain the same force (and rate) versus displacement properties until a sufficiently high dynamic pressure is reached in the main chamber 32 that is equal to the pressure in the stuffer. Beyond that, the entire volume of the air spring would be available to limit peak pressure during a large impact.

The energy required to fill the secondary bladder 30 could be provided by an auxiliary pump. Alternatively, the high-pressure air in the air spring reserve tank could be used to push the air or fluid into the secondary bladder 30 assuming the pressure in the reserve tank is higher than pressure in the main chamber of the air spring. This would not require an additional pump, but instead could use an electronically controlled value to control the filling and emptying of the secondary bladder.

The present disclosure allows the air spring main chamber 32 volume to be a continuously calibratable aspect of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A suspension air spring, comprising:
a spring mount assembly;
a diaphragm seat spaced from the spring mount;
a diaphragm having a first end mounted to the spring mount assembly and a second end mounted to the diaphragm seat to create a main chamber between the spring mount assembly and the diaphragm seat, wherein the diaphragm rolls upon the diaphragm seat; and an inflatable secondary bladder expandable within the main chamber.

2. The suspension air spring according to claim 1, further comprising a fluid source in communication with the inflatable secondary bladder.

3. The suspension air spring according to claim 2, further comprising a control unit for controlling delivery of a fluid from the fluid source to the inflatable secondary bladder.

4. The suspension air spring according to claim 3, further comprising a valve controlled by the control unit for allowing release of the fluid from the inflatable secondary bladder.

5. The suspension air spring according to claim 1, further comprising a compressed air source in communication with the inflatable secondary bladder.

6. The suspension air spring according to claim 5, further comprising a control unit for controlling delivery of compressed air from the compressed air source to the inflatable secondary bladder.

7. The suspension air spring according to claim 6, further comprising a valve configured to be controlled by the control unit for allowing release of the compressed air from the inflatable secondary bladder.

8. The suspension air spring according to claim 1, further comprising a strut assembly supporting the diaphragm seat and including a piston rod connected to the spring mount assembly and supporting a piston within a cylinder of the strut assembly.

9. The suspension air spring according to claim 8, further comprising a jounce bumper connected to the spring mount assembly opposite the diaphragm seat.

10. The suspension air spring according to claim 9, wherein the jounce bumper surrounds the piston rod.

11. A suspension air spring, comprising:
a spring mount assembly;
a diaphragm seat spaced from the spring mount;
a diaphragm having a first end mounted to the spring mount assembly and a second end mounted to the diaphragm to create a main volume between the spring mount assembly and the diaphragm seat, wherein the diaphragm rolls upon the diaphragm seat;
an inflatable secondary bladder disposed within the main volume; and
a fluid source in communication with the inflatable secondary bladder.

12. The suspension air spring according to claim 11, further comprising a control unit for controlling delivery of a fluid from the fluid source to the inflatable secondary bladder.

13. The suspension air spring according to claim 12, further comprising a valve controlled by the control unit for allowing release of the fluid from the inflatable secondary bladder.

14. The suspension air spring according to claim 11, further comprising a strut assembly supporting the diaphragm seat and including a piston rod connected to the spring mount assembly and supporting a piston within a cylinder of the strut assembly.

15. The suspension air spring according to claim 14, further comprising a jounce bumper connected to the spring mount assembly opposite the diaphragm seat.

16. A suspension air spring, comprising:
a spring mount assembly;
a diaphragm seat spaced from the spring mount;
a diaphragm having a first end mounted to the spring mount assembly and a second end mounted to the diaphragm to create a main volume between the spring mount assembly and the diaphragm seat, wherein the diaphragm rolls upon the diaphragm seat;
an inflatable secondary bladder disposed within the main volume; and
a compressed air source in communication with the inflatable secondary bladder.

17. The suspension air spring according to claim 16, further comprising a control unit for controlling delivery of compressed air from the compressed air source to the inflatable secondary bladder.

18. The suspension air spring according to claim 17, further comprising a valve configured to be controlled by the control unit for allowing release of the compressed air from the inflatable secondary bladder.

19. The suspension air spring according to claim 16, further comprising a strut assembly supporting the diaphragm seat and including a piston rod connected to the spring mount assembly and supporting a piston within a cylinder of the strut assembly.

20. The suspension air spring according to claim 19, further comprising a jounce bumper connected to the spring mount assembly opposite the diaphragm seat.

* * * * *